(12) United States Patent
Choi

(10) Patent No.: US 8,353,024 B2
(45) Date of Patent: Jan. 8, 2013

(54) METHOD OF TRANSMITTING INFORMATION EFFECTIVELY IN SERVER/CLIENT NETWORK AND SERVER AND CLIENT APPARATUSES USING THE SAME

(75) Inventor: Hyok-sung Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1226 days.

(21) Appl. No.: 11/925,065

(22) Filed: Oct. 26, 2007

(65) Prior Publication Data

US 2008/0250491 A1 Oct. 9, 2008

(30) Foreign Application Priority Data

Apr. 9, 2007 (KR) .................. 10-2007-0034662

(51) Int. Cl.
*G06F 7/04* (2006.01)
*G06F 11/30* (2006.01)
*H04L 9/00* (2006.01)

(52) U.S. Cl. ............... 726/14; 726/11; 726/13; 726/15; 713/153; 713/154; 713/168; 713/169

(58) Field of Classification Search ............... 726/14
See application file for complete search history.

(56) References Cited

U.S. PATENT DOCUMENTS 7,376,050 B2 * 5/2008 Yanase ........................... 368/10

FOREIGN PATENT DOCUMENTS

| JP | 2002-108729 A | 4/2002 |
| JP | 2002-108729 | * 12/2002 |
| KR | 10-2003-080006 A | 10/2003 |
| KR | 10-2005-0055770 A | 6/2005 |

OTHER PUBLICATIONS

Hideaki et al. (Japan Patent "JP-2002-108729": Network Connecting Devices with Firewall Control program).*

* cited by examiner

*Primary Examiner* — Longbit Chai
(74) *Attorney, Agent, or Firm* — Sughrue Mion, PLLC

(57) ABSTRACT

A method for transmitting information effectively in a server/client network system is provided, the network system including a client placed behind a firewall and a server that provides the client with a predetermined service. The method includes the client generating a hole packet which is for making a hole in the firewall to allow a packet to pass through the firewall from the server, the hole being maintained for a certain period of time, and transmitting the hole packet to the firewall; and transmitting a packet from the server to the client through the hole made by the hole packet.

25 Claims, 6 Drawing Sheets
(3 of 6 Drawing Sheet(s) Filed in Color)

METHOD OF TRANSMITTING INFORMATION EFFECTIVELY IN SERVER/CLIENT NETWORK AND SERVER AND CLIENT APPARATUSES USING THE SAME

CROSS-REFERENCE TO RELATED APPLICATION

This application claims priority from Korean Patent Application No. 10-2007-0034662 filed on Apr. 9, 2007 in the Korean Intellectual Property Office, the disclosure of which is incorporated herein by reference in its entirety.

BACKGROUND OF THE INVENTION

1. Field of the Invention

Methods and apparatuses consistent with the present invention relate to information transmission in a server/client network system, and more particularly, to a method of transmitting information effectively in a server/client network and a server apparatus and a client apparatus using the method in order to minimize load without modification of a firewall or a network address translator, the load due to the simultaneous connection between a plurality of clients located behind the firewall and/or the network address translator, and a server which provides these clients with services.

2. Description of the Related Art

In systems where clients are connected to a server on a network over the Internet, network connection structures are becoming more and more complicated in terms of security or efficiency of the network. An asynchronous information transmission system in a typical server/client network environment will now be described with reference to FIG. 1.

The system in FIG. 1 includes a server 10, a client A 41, a client B 42, and a client C 43, and a firewall 20 or a network address translator (NAT) 30 may be selectively present on the client side. In a client-to-server connection through which information is transmitted from the client to the server, the connection is established from an IP address of the client B 42 and a port to an IP address of the server 10 and the port, whereas in a server-to-client connection through which information is transmitted from the server 10 to the client B 42, the connection is established from the IP address of the server 10 and the port to the IP address of the client B 42 and the port. The firewall 20 and the NAT 30 are set so as not to block transmission through the client to server connection and to act as if they did not exist in the system, and to selectively block transmission through the server to client connection. Specifically, in the case of the firewall 20, information transmission is generally blocked as long as the setting of the firewall 20 is not changed, and in the case of the NAT 30, in the course of transmitting an internal IP, which is assigned to the client B 42, to the server 10 after converting the internal IP into an external IP of the NAT 30, since the external IP of the NAT 30 connected to the server 10 and the internal IP of the client B 42 which is placed behind the NAT 30 differ from each other, the information can be transmitted to the client B 42 only if port forwarding is set properly.

As such, in the general server/client network environment, information transmission from a client to a server can be performed without any problem, but the information transmission from the server to the client may not be performed properly because of the block by a firewall. Thus, to overcome this inefficiency, generally, there may be two different asynchronous information transmission methods.

First, the above problem may be solved by changing or manipulating some settings of a firewall or of an NAT using previously well-known methods (for example, methods using UPnP gateway protocol or NAT traversal). In this case, it can be advantageous to use the general network protocol, but there can be difficulty in applying this method practically. This is because all methods of properly manipulating the firewall and the NAT should be made available and the client should be coded in order to respond to all situations which might occur according to these methods. Although these problems may be overcome, this method cannot solve complications in an environment where several firewalls and NAT are installed in an overlay fashion.

Second, a polling method may be used, in which a client-to-server connection is used to solve a problem of a server-to-client connection. In the polling method, a client periodically accesses a server to obtain necessary information, or if there is information which needs to be transmitted to the client, the server stores information temporarily and pushes the temporarily stored information to the client when the client accesses the server at an arranged time.

According to the polling method, when it is assumed that the polling interval of a client-to-server connection is 10 seconds and the number of clients which are online concurrently is 10,000, and when information is transmitted to on-line clients in response to the users remote control or information updating, the total number of occurrences of information transmission per hour is 1,000 on average, the polling efficiency (the total number of information transmission/the total number of accesses to the server) for the server is 1,000/3,6000,000=0.0002777 . . . , that is, 0.028%. In this case, to reduce the load, the polling interval may be extended, for example, when the polling interval is set to 10 minutes instead of 10 seconds, the polling efficiency is 1,000/60,000=0.0166 . . . , that is, approximately 1.67%. This polling efficiency is not high enough, and it may take a maximum 10 minutes for the updated information to be reflected.

In other words, according to the above method, since periodical access (from the clients to the server) is necessary even when a particular information transmission is not required, the number of clients which are online to access to the server is increasing, and thus a load of the server is also increasing regardless of the amount of information or events.

SUMMARY OF THE INVENTION

The present invention provides a method of transmitting information effectively in a server/client network, and a server apparatus and a client apparatus using the method in order to reduce a load of a server, which transmits information to a plurality of clients simultaneously, without additionally manipulating a firewall and/or a network address translator.

These and other objects of the present invention will be described in or be apparent from the following description of the preferred embodiments.

According to an aspect of the present invention, there is provided a method of transmitting information effectively in a network which includes a client placed behind a firewall and a server that provide the client with a predetermined service, the method including the client generating a hole packet which is for making a hole in the firewall to allow a packet to pass through the firewall from the server, the hole being maintained for a certain period of time, and transmitting the hole packet to the firewall, and transmitting a packet from the server to the client through the hole made by the hole packet.

According to another aspect of the present invention, there is provided a client apparatus which is placed behind a firewall and transmits and receives a packet to/from a server, the client apparatus including a server service client module which establishes an initial connection with the server by transmitting identification information of the server service client module, an internal IP address and port number of the server service client module, and information about a service, which the server service client module wants the server to provide, to the server, and a client service demon module which generates and transmits a hole packet to the firewall, the hole packet for making a hole in the firewall to allow a packet to pass through the firewall from the server while the initial connection is being established, the hole being maintained for a certain period of time.

According to still another aspect of the present invention, there is provided a server apparatus which transmits and receives a packet to/from a client apparatus placed behind a firewall, the server apparatus including a server service demon module which transmits an IP address and port number of the server service demon module and an external IP address and port number of the client apparatus which the server service demon module recognizes to the client apparatus, and a client service client module which transmits a service to the client apparatus through a hole which is made in the firewall by the client apparatus, wherein the hole is made by a hole packet, which sets an IP address and port number of the client apparatus as an IP address and port number of a source and an IP address and port number of the server as an IP address and port number of a destination, and is maintained for a certain period of time.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the present invention will become more apparent by describing in detail preferred embodiments thereof with reference to the attached drawings in which.

DETAILED DESCRIPTION OF THE INVENTION

Aspects and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Figure 1:
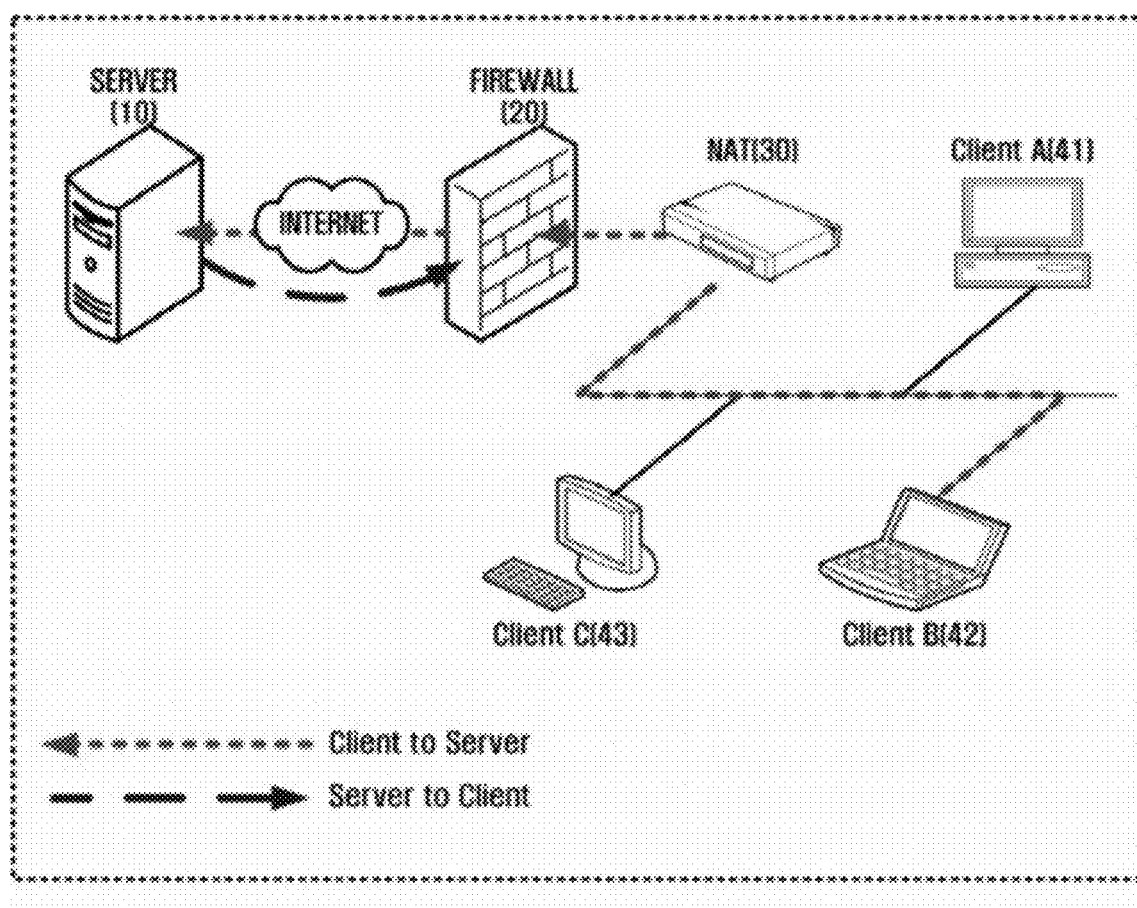
FIG. 1 is a drawing illustrating a system of a server/client network according to the conventional art.
Figure 2:
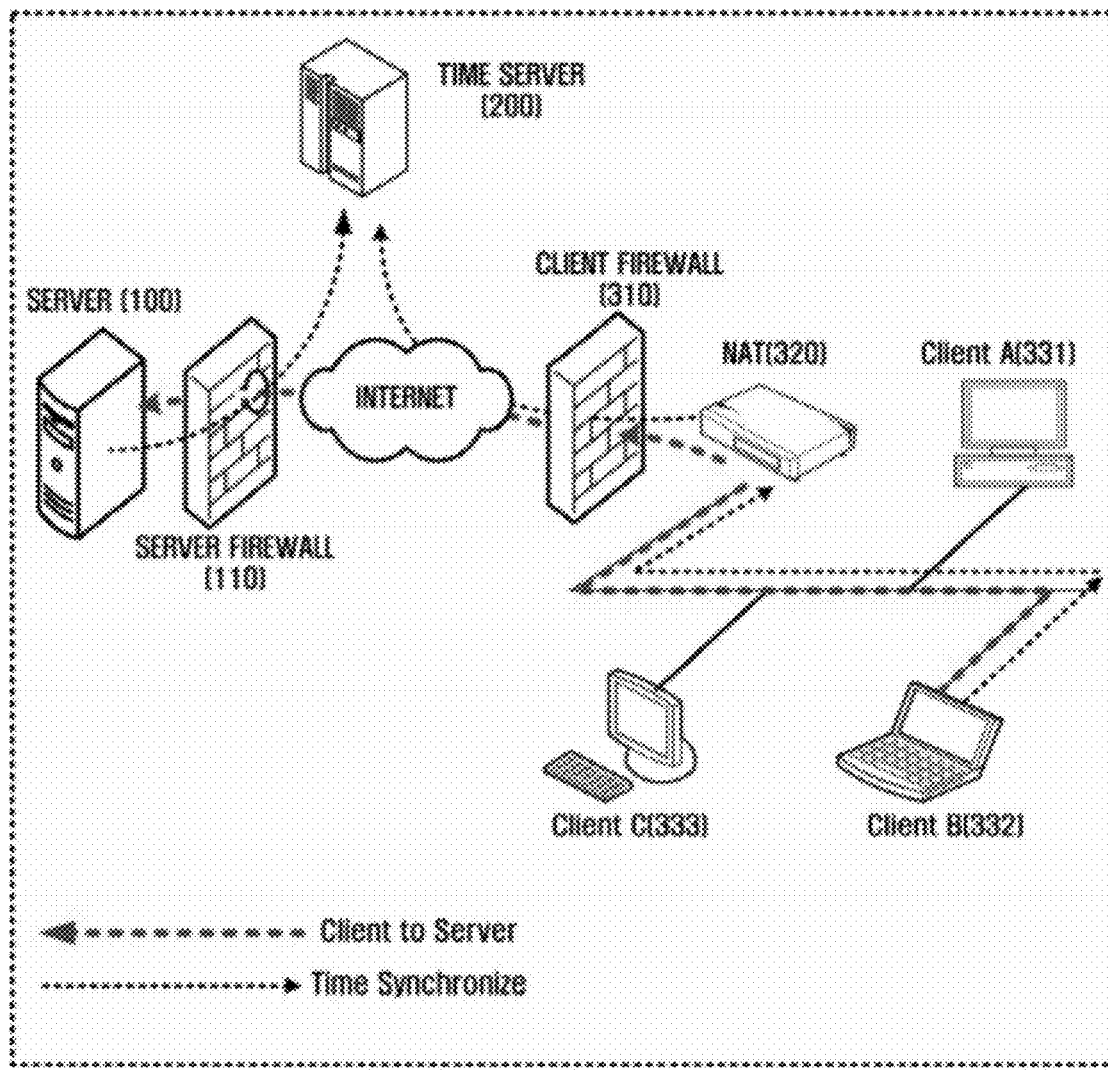
FIG. 2 is a system diagram showing an initial connection in a server/client network according to an embodiment of the present invention.
Figure 3:
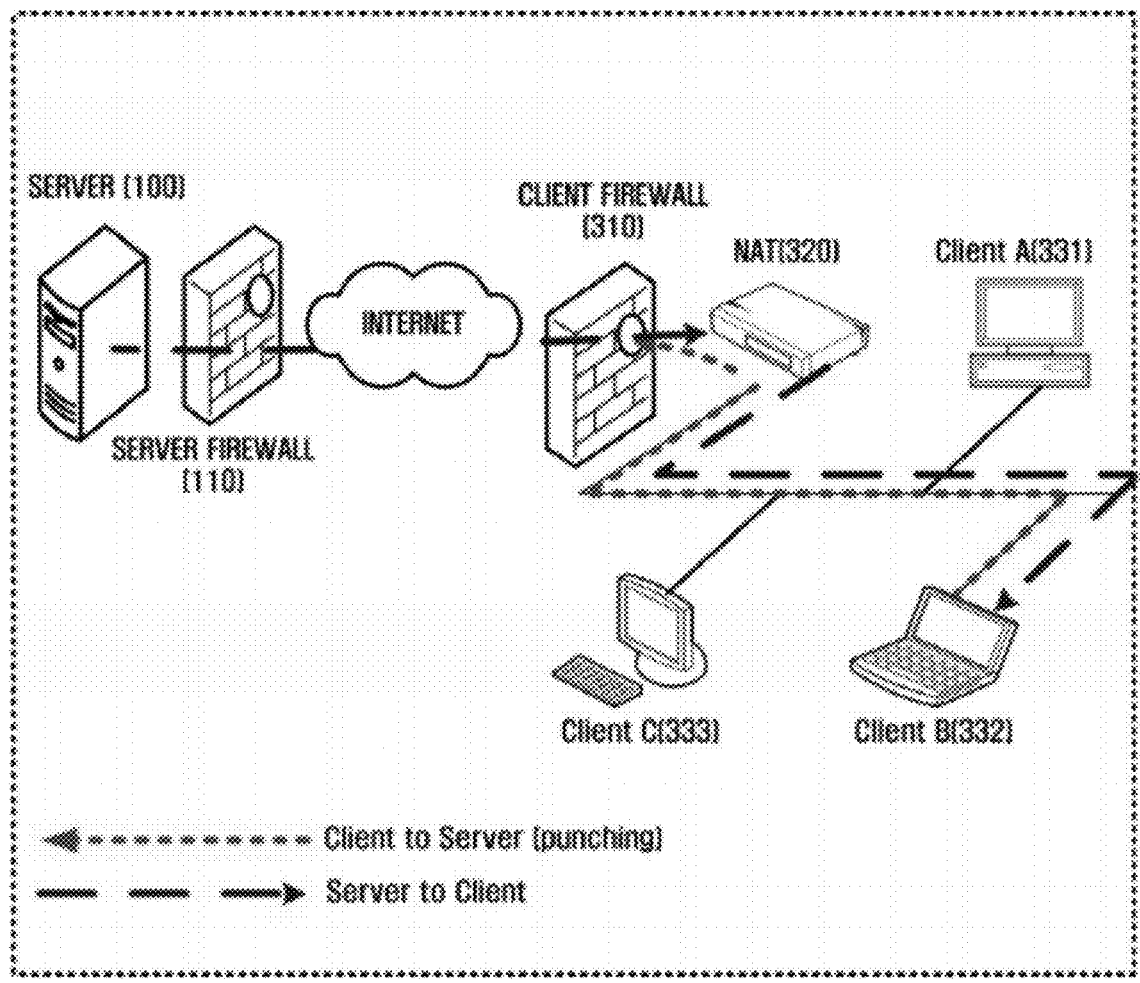
FIG. 3 is a system diagram showing effective information transmission in a server/client network according to an embodiment of the present invention.
Figure 4:
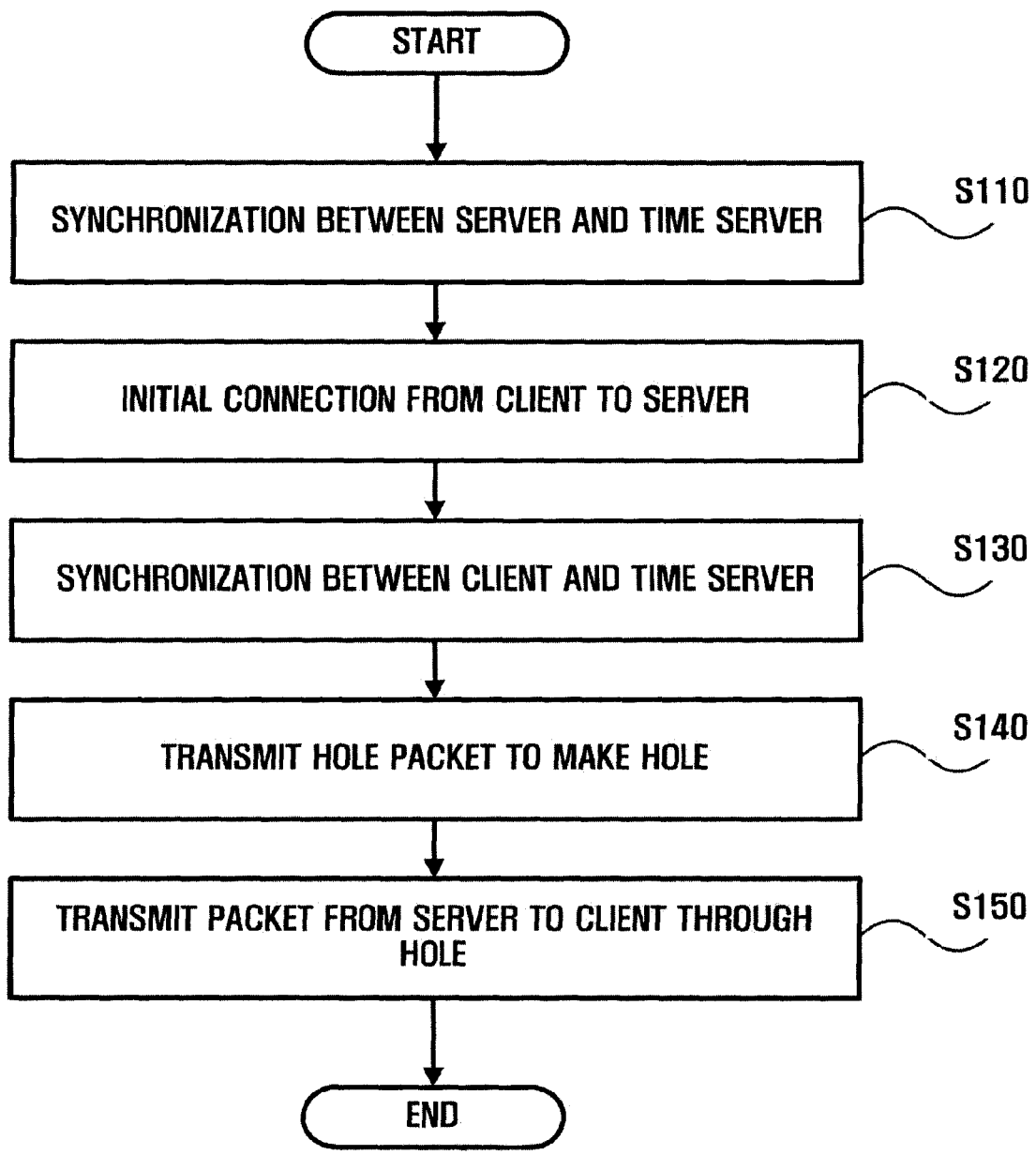
FIG. 4 is a flowchart of a method of transmitting information effectively in a server/client network according to an embodiment of the present invention.

First, an overall operation of an effective information transmission method in a server/client network according to an embodiment of the present invention will be described with reference to FIGS. 2 through 4. FIG. 2 is a system diagram showing an initial connection in a server/client network according to an embodiment of the present invention, FIG. 3 is a system diagram showing effective information transmission in a server/client network according to an embodiment of the present invention, and FIG. 4 is a flowchart of a method of transmitting information effectively in a server/client network according to an embodiment of the present invention.

Referring to FIG. 2, a server firewall 110 is set to allow information to be transmitted from a client side including a client A 331, a client B 332, and a client C 333 to an IP address of a server 100 and a port and to block the connection from a server side to the client side. Here, the server 100, which provides services, synchronizes a time server 200 and a system clock (S110). A detailed description of a specific method of synchronizing the system clock will be omitted because the conventional synchronization methods such as the Internet standard 12 and the network time protocol (NTP) defined by the Requests for Comments (RFC) 1119 can be used for the synchronization. The synchronization with the time server 200 should be performed periodically to prevent time drift.

After the synchronization described above, an initial connection from the client side 331, 332, and 333 to the server 100 is established (S120). Through the initial connection, the clients 331, 332, and 333 inform the server 100 that they are online on a network, and transmit information necessary to receive the service the server 100 provides. That is, the initial connection is a client-to-server connection which is illustrated with a thick dotted line in FIG. 2. The client B 332 transmits its identification information, its internal IP address and port number, and information about the service the client B wants to receive to the server 100 though the client-to-server connection. Then, the server 100 sends its IP address and port number, and an external IP address and port number of the client B 332 which the server 100 recognizes, to the client B 332. Moreover, the server 100 may send uniform resource locator (URL) information of a time server 200 which the client B 332 uses for the synchronization with the time server 200, information about the time at which the initial connection starts, and cycle information of the initial connection to the client B 332 as well. A client firewall 310 blocks information other than information like described above, which is transmitted from the server 100.

The external IP address and port number of the client B 332 are not the actual internal IP address and port number of the client B 332, but are an IP address and port number on the Internet, which have been converted by a network address translator NAT 320 and is recognized by the server 100. This is because the external IP address and port number of the client B 332 differ from the internal IP address and port number thereof when the NAT 320 or a virtual IP is used.

After the information transmission/receipt between the server 100 and the client B 332 is performed through the initial connection described above, the client B 332 synchronizes its time clock with the time server 200 using the URL information of the time server 200 (S130). The client firewall 310 does not function to block the connection for synchronization between the client B 332 and the time server 200. Ultimately, the time clock of the client B 332 is synchronized with the server 100. Since the synchronization between the time clock of the client B 332 and the server 100 is the same as the synchronization between the server 100 and the time server 200, the detailed description thereof will be omitted.

After the synchronization between the client B 332 and the time server 200 is performed, the client B transmits a hole packet to the client firewall 310 to make a hole. This procedure is illustrated with a thick dotted line labeled Client to Server (punching) in FIG. 3.

Referring to FIG. 3, it is noticed that the time server 200 is omitted from the system in FIG. 2 and a hole is made in the client firewall 310. The hole packet acts to punch the client firewall 310 to make a hole temporarily so that a packet for a particular service can be transmitted from the server 100 only to a corresponding client (here, the client B 332). The hole packet should be transmitted only from the client side 331, 332, and 333, a message is divided into packets, and a user datagram protocol (UDP) packet which does not need to be reassembled in the opposite side can be used as the hole packet. When it is assumed that the client B 332 transmits the hole packet, in the hole packet, the IP address and port number of the client B are set as an IP address and port number of a source, and the IP address and port number of the server 100 are set as an IP address and port number of a destination.

Moreover, in a header of the hole packet, Time to Live (TTL), that is field information for determining the destruction to prevent the hole packet from being routed around the network is written. The TTL decreases by 1 each time the hole packet passes through one hop, and when the value of the TTL becomes 0, the hole packet is destroyed for reduction of a network load. Then, the client firewall 310 requests the client B 332 to resend a hole packet. In the embodiment according to present invention, a value of the TTL may be set to a value which is obtained by adding one to the number of hops that is the number of data links from the actual internal IP address of the client B 332 to the external IP address thereof which is recognized by the server 100. This is because that the number of hops between the client firewall 310 and the NAT 320 can be considered as 1. By setting the value of the TTL to a value obtained by adding one to the number of hops between the internal IP address to the external IP address, the hole packet is not able to be forwarded to the server 100 any longer and is destroyed once making a hole in the client firewall 310.

After the client B 332 makes the hole in the client firewall 310 using the hole packet, the server 100 transmits a packet for the service to the client B 332 through the hole (S150). This procedure is illustrated with a blue dotted line in FIG. 3.

The server 100 stores information to be transmitted to a certain client (here, the client B 332) in a temporary queue each time an event occurs, for example, there is a service to be provided to the client B 332, or information to be updated, or remote control is needed. This is because that the hole is not always open, but is maintained for a certain period of time.

The server 100 should transmit the information stored in the temporary queue to the client B 332 during the client firewall 310 is opened by the hole. The information stored in the temporary queue is transmitted to the client B 332 according to the result of comparing a remainder A obtained by dividing the time D from the starting time S time of the initial connection from the client B 332 to the server 100 to the current time C time, that is, D=C time S time, by a period P of the connection with the available time M during which the hole is maintained. Specifically, when the remainder A is smaller than the available time M, the information stored in the temporary queue is immediately transmitted to the client B 332, and otherwise, the information is transmitted after a period R of time which is obtained by subtracting the remainder A from the period P of the connection.

The description of the above embodiment can be applied to any forms of server/client network environment.

Figure 5:
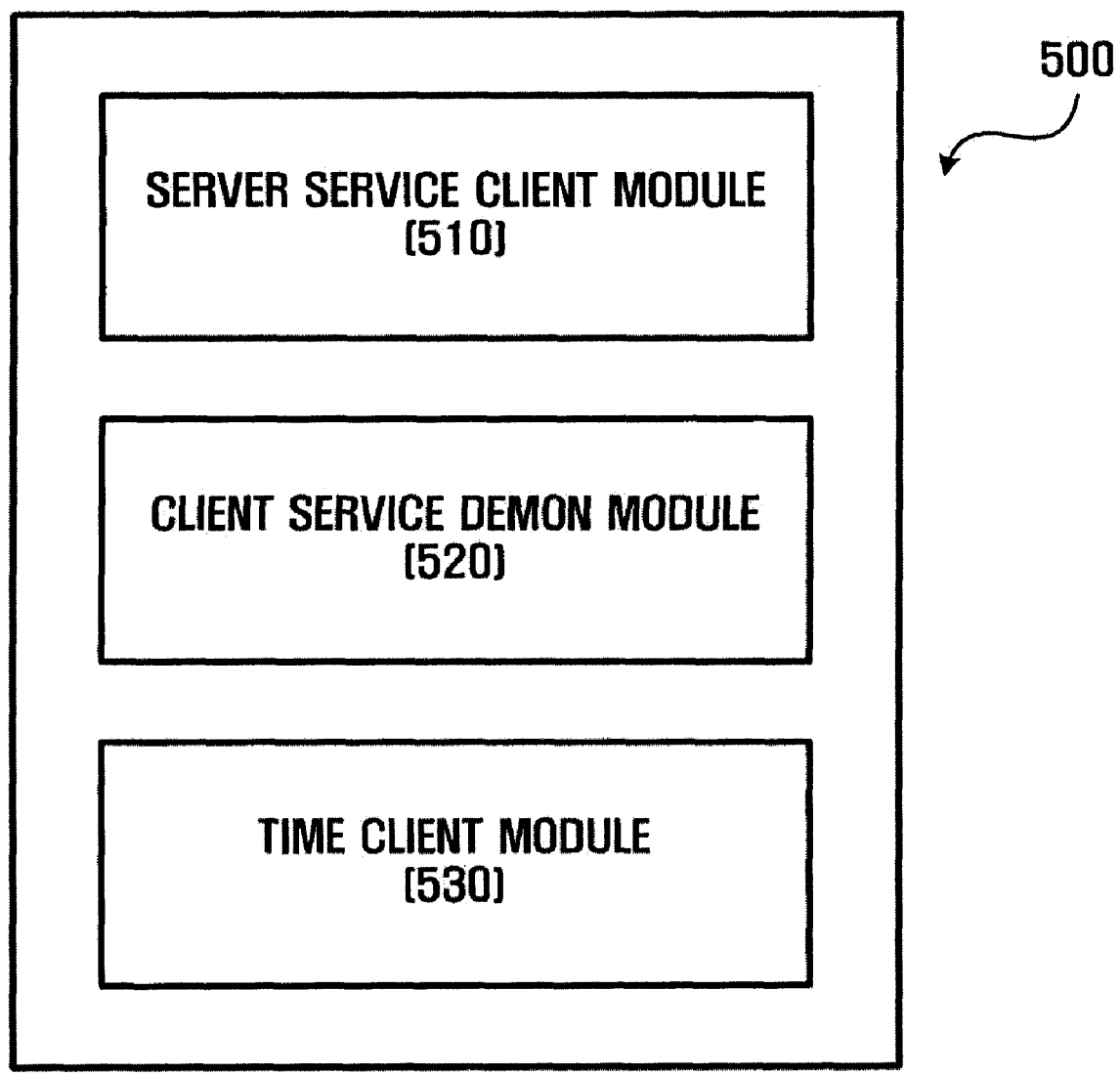
FIG. 5 is a block diagram of a client apparatus according to an embodiment of the present invention.

FIG. 5 is a block diagram of a client apparatus 500 according to an embodiment of the present invention. The client apparatus 500 includes a server service client module 510, a client service demon module 520, and a time client module 530.

The server service client module 510 acts as a client for services provided by the server 100 and establishes an initial connection by transmitting identification information of itself, an internal IP address and port number of itself, and information of the service desired to be provided by the server 100. In addition, the server service client module 510 requests and receives an IP address and port number of the server 100, an external IP address and port number of the client service demon module 520 which are recognized by the server 100, URL information of a time server 200 for synchronization, information S time of the starting time of the connection to the server 100 and period information P of the connection from the server 100.

The client service demon module 520 generates a hole packet, which is for making a hole in a client firewall 310 to allow a packet from the server 100 to pass through while the initial connection is being established and is maintained for a certain period of time, and transmits the hole packet to the client firewall 310.

The time client module 530 acts to synchronize with the server 100 using the URL information of the time server 200 which the server service client module 510 has received.

Figure 6:
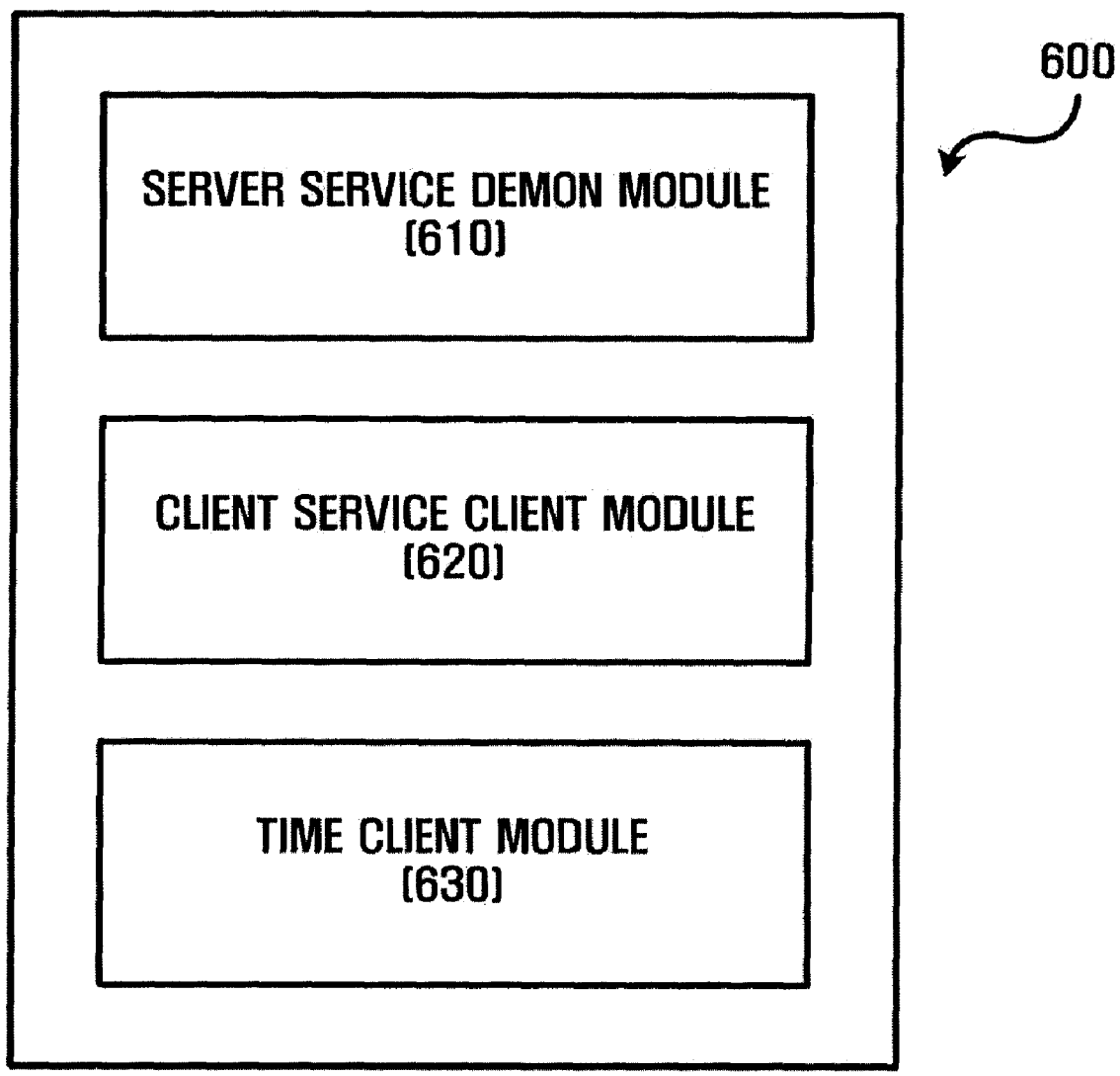
FIG. 6 is a block diagram of a server apparatus according to an embodiment of the present invention.

FIG. 6 is a block diagram of a server apparatus 600 according to an embodiment of the present invention. The server apparatus 600 includes a server service demon module 610, a client service client module 620, and a time client module 630.

The server service demon module 610 functions to transmit its IP address and port number, and an external IP address and port number of the client apparatus 500 which the server service demon module 610 recognizes to the server service client module 510. Furthermore, the server service demon module 610 may also transmit the URL information of the time server 200 for synchronization, the information S time of the starting time of the connection to the server, and the period information P of the connection.

The client service client module 620 acts as a client for the client service demon module 520, and transmits a packet to the client apparatus 500 through the hole made in the client firewall 310. Moreover, the client service client module 620 stores information, which is desired to be transmitted to the client apparatus 500 each time an event related to the service the server 100 can provide occurs, to a temporary queue. Then, the client service client module 620 transmits the information stored in the temporary queue to the client apparatus 500 according to a result of comparing a remainder A obtained by dividing the time D from the starting time S time of the connection to the current time C time, that is, D=C time S time, by the period P of the connection with the certain period M of time during which the hole is maintained. Since this procedure was described before, the detailed description thereof will be omitted.

The time client module 630 performs the synchronization with the time server 200 using the URL information of the time server 200.

Meanwhile, the term 'unit', that is, 'module' or 'table', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. The functionality provided for in the components and modules may be combined into fewer components and modules or further separated into additional components and modules. In addition, the components and modules may be implemented such that they execute one or more CPUs in a device.

It is obvious that the scope of a method of transmitting information effectively in a server/client network according to embodiments of the present invention reaches a computer readable recording medium having embodied thereon a computer program for executing the above method.

According to embodiments of the present invention, there will be at least one effect as follows.

Since a firewall and/or a network address translator are/is not manipulated additionally, a server side that transmits information simultaneously to a plurality of clients establishes a connection only when the information transmission is necessary and a load of the server is determined regardless of the number of clients which are online and only in proportion to the number of events or items of information that the server desires to transmit, the connection between the server and the clients can be effectively established.

The effects of the present invention should not be limited to the foregoing description, and additional effects and advantages of the invention will be made more apparent to those skilled in the art from the spirit and scope of the invention as defined by the appended claims.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A method of transmitting information effectively in a network which includes a client placed behind a firewall and a server that provides the client with a service, the method comprising:
   configuring a processor to perform:
   generating, by the client, a hole packet for making a hole in the firewall to allow a first packet to pass through the firewall from the server to said client, the hole being maintained for a certain period of time, and
   first transmitting the hole packet to the firewall, wherein an initial connection is established from said client to said server prior to said transmitting; and
   second transmitting the first packet from the server to the client through the hole made by the hole packet using corresponding address information designated in said hole packet to said client.

2. The method of claim 1, further comprising:
   establishing an initial connection from the client to the server before the first transmitting the hole packet to the firewall,
   wherein the establishing of the initial connection includes
   third transmitting identification information of the client, an internal IP address and a port number of the client, and information about the service that the client wants the server to provide, from the client to the server, and fourth transmitting a first IP address and a port number of the server, and an external IP address and a port number of the client that the server recognizes, from the server to the client.

3. The method of claim 2, wherein the fourth transmitting includes transmitting uniform resource locator (URL) information of a time server for synchronization, information of starting time of the initial connection from the client to the server, and information of a period of the initial connection together with the first IP address and the port number of the server, and the external IP address and the port number of the client that the server recognizes, from the server to the client.

4. The method of claim 3, further comprising:
   the client performing synchronization with the server using the received URL information of the time server.

5. The method of claim 4, further comprising:
   performing synchronization between the server and the time server using the URL information of the time server.

6. The method of claim 2, wherein the transmitting of the packet from the server to the client includes storing information that the server wants to transmit to the client each time an event related to the service occurs in a temporary queue, and transmitting the information stored in the temporary queue to the client based on a result of comparing a remainder, which is obtained by dividing a time from the starting time of the initial connection to the current time by the period of the connection, with the certain period of time during which the hole is maintained.

7. The method of claim 6, wherein the transmitting of the information stored in the temporary queue to the client includes transmitting the information stored in the temporary queue to the client immediately when the remainder is smaller than the certain period of time during which the hole is maintained or transmitting the information stored in the temporary queue after a certain period of time which is obtained by subtracting the remainder from the period of the connection when the remainder is greater than the certain period of time during which a hold is maintained.

8. The method of claim 1, wherein the hole packet is generated by setting an IP address and a port number of the client as an IP address and a port number of a source and setting an IP address and a port number of the server as an IP address and a port number of a destination.

9. The method of claim 1, wherein the hole packet includes a user datagram protocol (UDP) packet.

10. The method of claim 1, wherein the hole packet has "Time to Live" (TTL) field information including a value obtained by adding one to a number of hops from an internal IP address of the client which is placed behind the firewall to an external IP address of the client that is recognized by the server.

11. A client apparatus which is placed behind a firewall and transmits and receives a packet to/from a server, the client apparatus comprising:
   a server service client module, implemented in hardware, which establishes an initial connection with the server by transmitting identification information of the server service client module, an internal IP address and a port number of the server service client module, and information about a service which the server service client module wants the server to provide, to the server; and
   a client service demon module which generates and transmits a hole packet to the firewall, wherein an initial connection is established from said client apparatus to said server prior to said transmitting, the hole packet for making a hole in the firewall to allow a first packet to pass through the firewall from the server to said client while the initial connection is being established the hole being maintained for a certain period of time using corresponding address information designated in said hole packet to said client apparatus.

12. The client apparatus of claim 11, wherein the server service client module requests and receives an IP address and a port number of the server and an external IP address and a port number of the client service demon module which the server recognizes, from the server.

13. The client apparatus of claim 12, wherein the server service client module requests and receives URL information of a time server for synchronization, information of a starting time of the initial connection to the server, and information of a period of the initial connection from the server.

14. The client apparatus of claim 13, further comprising:
a time client module which performs synchronization with the server using the URL information of the time server.

15. The client apparatus of claim 11, wherein the hole packet is generated by setting an IP address and port number of the client as an IP address and a port number of a source and setting an IP address and a port number of the server as an IP address and a port number of a destination.

16. The client apparatus of claim 11, wherein the hole packet includes a user datagram protocol (UDP) packet.

17. The client apparatus of claim 11, wherein the hole packet has "Time to Live" (TTL) field information including a value obtained by adding one to a number of hops from an internal IP address of the client which is placed behind the firewall to an external IP address of the client that is recognized by the server.

18. A server apparatus which transmits and receives a packet to/from a client apparatus placed behind a firewall, the server apparatus comprising:
a server service demon module, implemented in hardware, which transmits an IP address and a port number of the server service demon module and an external IP address and a port number of the client apparatus which the server service demon module recognizes, to the client apparatus; and
a client service client module which transmits a service to the client apparatus through a hole which is made in the firewall by the client apparatus,
wherein the hole is made by a hole packet transmitted from the client apparatus after initial connection is established from the client apparatus to the server apparatus, which sets an IP address and a port number of the client apparatus as an IP address and a port number of a source and an IP address and a port number of the server as an IP address and a port number of a destination, and is maintained for a certain period of time to allow a first packet to pass through the firewall from the server apparatus to said client apparatus using corresponding address information designated in said hole packet to said client apparatus.

19. The server apparatus of claim 18, wherein the server service demon module transmits uniform resource locator (URL) information of a time server for synchronization, information of a starting time of a connection to the server, and information of a period of the connection together with the IP address and the port number of the server service demon module and the external IP address and the port number of the client apparatus which the server service demon module recognizes, to the client apparatus.

20. The server apparatus of claim 18, wherein the hole packet has "Time to Live" (TTL) field information including a value obtained by adding one to a number of hops from an internal IP address of the client which is placed behind the firewall to an external IP address of the client that is recognized by the server.

21. The server apparatus of claim 19, wherein the client service client module stores information that the server wants to transmit to the client each time an event related to the service occurs in a temporary queue, and transmits the information stored in the temporary queue to the client based on a result of comparing a remainder, which is obtained by dividing a time from the starting time of the initial connection to the current time by the period of the connection, with the certain period of time during which the hole is maintained.

22. The server apparatus of claim 21, wherein the client service client module transmits the information stored in the temporary queue to the client immediately when the remainder is smaller than the certain period of time during which the hole is maintained or transmits the information stored in the temporary queue after a certain period of time which is obtained by subtracting the remainder from the period of the connection when the remainder is greater than the certain period of time during which a hold is maintained.

23. The server apparatus of claim 19, further comprising a time client module that performs synchronization between the server and the time server using the URL information of the time server.

24. The server apparatus of claim 18, wherein the hole packet includes a user datagram protocol (UDP) packet.

25. A non-transitory computer readable recording medium having embodied thereon a computer program for executing a method of transmitting information effectively in a network which includes a client placed behind a firewall and a server that provides the client with a service, the method comprising:
generating, by the client, a hole packet for making a hole in the firewall to allow a first packet to pass through the firewall from the server to said client, the hole being maintained for a certain period of time, and
first transmitting the hole packet to the firewall, wherein an initial connection is established from said client to said server prior to said transmitting; and
second transmitting the first packet from the server to the client through the hole made by the hole packet using corresponding address information designated in said hole packet to said client.

* * * * *